G. W. W. PERKINS.
PUMP VALVE.
APPLICATION FILED MAR. 19, 1915.
1,216,354.
Patented Feb. 20, 1917.
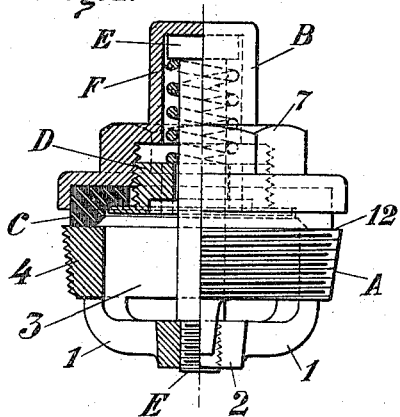
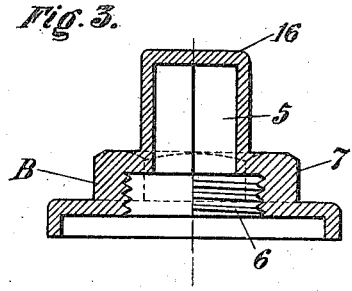
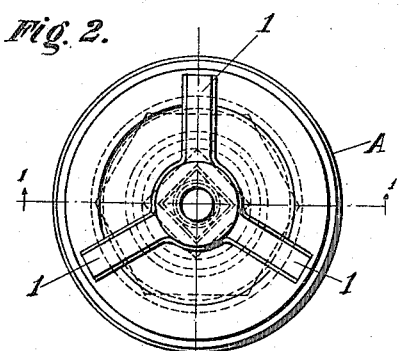
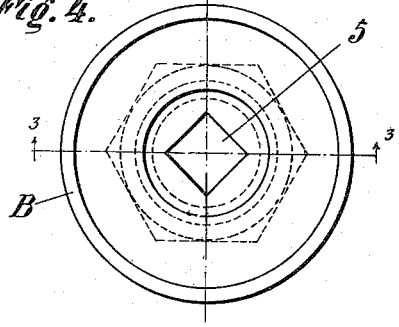
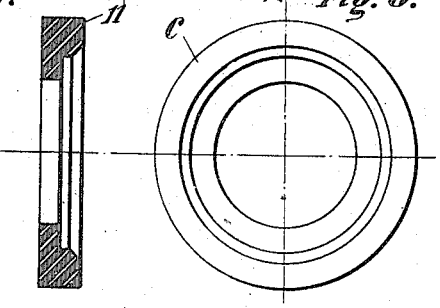
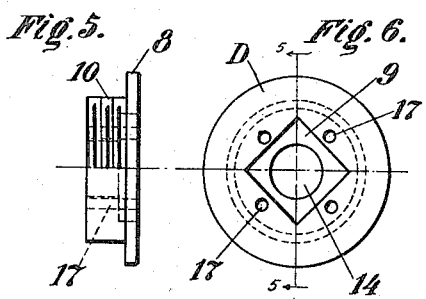
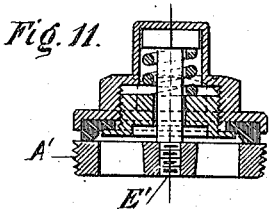
WITNESS
Louis L. Korach
INVENTORS:—
George W. W. Perkins
BY Jones, Addington,
Ames & Seibold
ATTORNEYS.

UNITED STATES PATENT OFFICE.

GEORGE W. W. PERKINS, OF CHICAGO, ILLINOIS.

PUMP-VALVE.

1,216,354. Specification of Letters Patent. Patented Feb. 20, 1917.

Application filed March 19, 1915. Serial No. 15,653.

*To all whom it may concern:*

Be it known that I, GEORGE W. W. PERKINS, a citizen of the United States, residing at Chicago, in the county of Cook and State of Illinois, have invented new and useful Improvements in Pump-Valves, of which the following is a full, clear, concise, and exact description, reference being had to the accompanying drawing, forming a part of this specification.

My invention relates to valves and has to do more particularly with check valves such as are used on various kinds of pumps, the object of my invention in general being to provide an improved and simplified structure of this kind.

There are various features in my invention which give it certain advantages over prior valves, such as the depressed spider arms connecting the outer ring or body and central support of the seat portion so that the inlet area may be as great as the conducting portion of the body. In the old type valve bodies the straight spider did not provide this advantage.

Another feature of my invention resides in the circular seating face around the outside edge of the valve which affords an easier flow and permits greater wear of the contacting parts without affecting the seat. Also the inclosed valve disk does not permit any leakage except through the seat and by the improved flanged retaining nut used, the disk or circular gate is held to better advantage. And due to the long bearing on the central bolt the gate or movable part of the valve is better held against tipping and thus the valve disk or gate has much longer life. Another feature of my invention resides in the inclosed spring whereby, should this spring be broken, it cannot get into the pump and the valve is still permitted to operate.

For a better understanding of my invention reference will now be had to the accompanying drawing, in which—

Figure 1 is a side elevation partly in section showing my improved valve;

Fig. 2 is a bottom view of Fig. 1;

Fig. 3 is a sectional view through the valve cage;

Fig. 4 is a bottom view of Fig. 3;

Fig. 5 is an edge view of the retaining plate;

Fig. 6 is a face view of Fig. 5;

Fig. 7 is a cross-sectional view of the valve disk along the line 7—7 of Fig. 8;

Fig. 8 is a face view of the valve disk;

Fig. 9 shows the central valve guard;

Fig. 10 is an end view of Fig. 9; and

Fig. 11 is a partial sectional view showing the valve cage used on an old style valve seat.

Referring first to the form shown in Figs. 1 to 10, it comprises a seat or tubular body portion A having depressed spider arms 1 connecting the threaded ring portion 4 to the central hub 2. By depressing the arms 1 the inlet area is made preferably at least as great as the area of the inner conducting portion 3. A cage B is provided which preferably supports the valve disk C which is preferably of rubber, but may be of any suitable material, such as fiber or metal, according to where used. This disk C is held in position by a retaining plate D which threads into the cage B, and by its flanged portion 8 securely holds the disk. The plate D has a square socket 9 shown in Figs. 5 and 6 so that it may be turned by a wrench to securely hold the disk C. The seat or face portion 11 of the disk C is preferably narrower than the seat 12 as by this construction longer life of the disk is secured when made of rubber because no overlapping of the rubber occurs. A central valve guard E extends from the hub 2 into the cup 16 of the cage B of the valve, said guard having a square head which fits slidably in the square hole 5 in the cup, there being preferably a spring F positioned between the head of the guard and the plate D in order to give the valve a quicker seating movement. The round portion of the guard E is loosely fitted in the central bearing 14 of the plate D, and thus due to the bearing of the head of the guard in the cup and the bearing of the shank in the plate, the tipping of the plate is reduced to a minimum and therefore the disk C is not worn unevenly, and thus has a longer life. This tipping of the valve disk is one of the bad features in prior valves of the present type.

In assembling the valve the spring F is first placed upon the guard E and the plate D is then slipped over the guard. After placing the disk C in the cage B the head of the guard is inserted in the square hole of the cage and then a wrench applied to the square socket 9 of the plate D and the plate turned until the valve disk C is securely held. The guard E now has its threaded portion screwed into the hub 2 of the valve seat and a wrench applied to the hexagon portion 7 of the cage which, upon being turned, also turns the guard E until the guard comes to its seat.

Thus the valve is assembled as shown in Fig. 1 and the gate, which I will refer to as comprising elements B, D and C, may thus be lifted against the action of spring F so that the valve is opened at its seat 12.

The gate of my valve may also be used with the old type seats A', having the straight spider arms, and when so used a shorter guard E' is provided so that it may be assembled as shown in Fig. 11.

Relief openings 17 are provided in the retaining plate to equalize the pressure above and below it and to permit the head of the valve guard to operate freely in the recess in the cage.

The seat and disk may be made flat as shown in the drawing or both may be tapered if desired.

Having thus described my invention what I claim as new and desire to secure by Letters Patent is:—

A valve comprising an annular externally threaded portion having a smooth unobstructed bore of substantially uniform diameter therethrough and having an annular seating portion the diameter of which is greater than the diameter of said bore, a spider having a hub portion entirely below the lower edge of said annular portion and having legs extending downwardly from the lower edge of said annular portion and thence inwardly to said hub portion, no portion of the legs lying within said annular portion, a smooth valve guard fixedly secured to said hub portion and extending upwardly through said bore that portion of the guard, lying within said annular portion being of substantially uniform cross section throughout its length, and a valve gate held in place by said guard and slidable therein having an annular portion for engaging said valve seat.

In witness whereof, I have hereunto subscribed my name.

GEORGE W. W. PERKINS.

Copies of this patent may be obtained for five cents each, by addressing the "Commissioner of Patents, Washington, D. C."